Patented Sept. 4, 1951

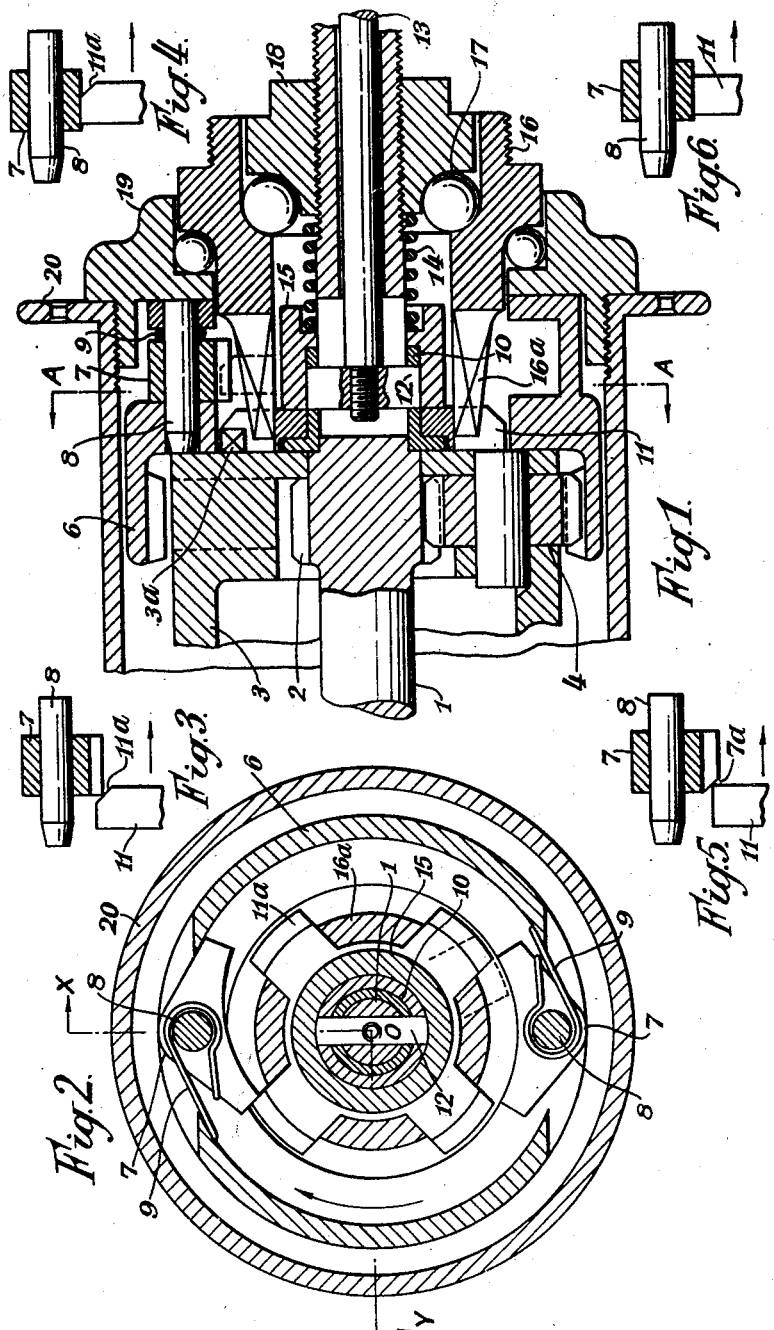

2,566,978

UNITED STATES PATENT OFFICE 2,566,978

SELECTOR MECHANISM FOR CHANGE SPEED HUB GEARS OF CYCLE WHEELS

William Brown, Nottingham, England

Application April 2, 1949, Serial No. 85,198
In Great Britain April 26, 1948

4 Claims. (Cl. 74—750)

This invention relates to selector mechanism for change speed hub gears of cycle wheels of the kind comprising epicyclic gearing having an axially movable selector member arranged to transmit the drive from an input member alternatively to the planet carrier or to the annulus of the epicyclic gear train through complementary engageable elements on the planet carrier and annulus, the selector member for one change of gear ratio moving axially out of engagement with the set of such elements on the planet carrier and into engagement with another set of such elements on the annulus. Such change of ratio is to be found in most hub gears whether having 2, 3 or more alternative gear ratios.

The disadvantages at present found in all epicyclic hub gears having such change of ratio are, firstly, that a neutral position must be provided to prevent locking and resultant damage during axial travel of the selector member from engagement with the set of complementary engageable elements on the planet carrier or annulus before coming into engagement with the other set of elements on the annulus or planet carrier respectively so that the total axial travel of the selector member includes the distance of travel through such neutral position as well as the separate distances of travel respectively out of full engagement with one set of complementary elements and into full engagement with the other set. Secondly, due to the fact that the relative angular positions of the said sets of complementary engageable elements are changeable and undetermined by virtue of the gearing between them, the selector member is more likely, in its axial movement, to abut against, instead of entering into correct engagement with the next set of complementary engageable elements towards which it is being moved. Such abutment prevents axial movement of the selector member and may result in straining of the selector-moving mechanism with subsequent incorrect relative positioning of the selector member or may cause damage of some other kind.

The object of the present invention is an improved construction of selector mechanism for a change speed hub gear of the kind referred to and in which the aforesaid disadvantages are eliminated.

According to the invention, selector mechanism for a change speed hub gear of the kind referred to is characterised in that the complementary engageable elements on the annulus constitute with the axially slidable selector member a unidirectional clutch with the parts thereof having complementary lateral chamfer to permit axial non-clutching engaging movement of the selector member with such elements, the selector member being axially longer than the spacing between the complementary engageable elements on the planet carrier and annulus respectively.

According to one embodiment of the invention selector mechanism for a change speed hub gear of the kind referred to is characterised in that the complementary engageable element on the annulus comprises at least one pawl serving only such function and adapted to be tripped by lateral abutment of the selector member therewith, or to over-ride the selector member, whereby overlapping progressive axial disengagement and axial positioning for engagement of the selector member with the said complementary engageable elements on the planet carrier and annulus respectively, or axial engagement and axial positioning for disengagement may occur without locking of the epicyclic gearing.

In the accompanying drawings:

Fig. 1 is an axial sectional elevation taken on line XOY of Fig. 2 of one example of selector mechanism made in accordance with this invention and as applied to a 2-speed cycle wheel hub gear;

Fig. 2 is a cross section on line A—A of Fig. 1;

Figs. 3 and 4 are fragmentary views showing the action of the selector and pawl shown in Figs. 1 and 2;

Figs. 5 and 6 are similar fragmentary views showing a modification.

As shown in Fig. 1 the epicyclic gear system consists of the fixed member 1 on which is formed the sun pinion 2, a planet carrier 3, with planet pinions 4, mounted therein by pins 5 and having dog members 3a on its face (forming the set of complementary engageable elements on the planet carrier), an internally toothed annulus 6 carrying one or more pawls 7 (forming the other set of complementary engageable elements on the annulus) mounted on pins 8 and operated in an inwards direction by springs 9 so as to project into the bore of annulus 6. Sliding on the fixed member 1 is a sleeve 10 carrying a selector member 11, operated in one direction by the key 12 and rod 13 and in the other direction by the spring 14 and thrust ring 15. An input member 16 is journaled by the ball race 17 to the fixed bearing member 18 and has prongs 16a cut thereon to engage with the selector member 11. On the input member is journaled the bearing cup 19 for the hub shell 20. The remainder of the hub is omitted for clarity.

The operation of the device is such that when no pull is applied to the rod 13, the sleeve 10, selector member 11 and thrust ring 15 take up the position shown with the selector member 11 engaging the dogs 3a so that the drive passes from the input member 16 through the selector member 11 and dogs 3a to the planet carrier 3, the annulus 6 being driven in the same direction but at a higher speed. When a pull is applied to the rod 13 the selector member 11 is moved to the right so as to disengage from the planet carrier dogs 3a. No neutral position is provided for the selector member 11 so that, if such axial movement of the selector member occurs while the gear is rotating, the faster-moving annulus pawls 7 over-ride the selector member 11 (as shown for the dotted position of the selector in the lower part of Fig. 2) until such time as the selector member 11 leaves the dogs 3a whereupon it will engage and take up the drive with the annulus pawls 7 as shown in the full-lined position of Fig. 2. It will therefore be seen that the selector member 11 being axially longer than the spacing between the dogs 3a and the pawls 7 respectively while moving progressively out of engagement with the dogs 3a, also moves simultaneous and progressively towards its position for full engagement with the pawls 7, though actual driving engagement with such pawls does not occur until the selector member disengages from the dogs 3a. Should a pull be applied to the rod 13 whilst the gear is stationary and at such time as the pawls 7 are opposite the limbs of the selector member 11 then the chamfer 11a on the selector limbs will raise each of the pawls 7 by abutting on its corner as shown in Fig. 3 so allowing the selector member to move axially in the direction of the arrow until it lies wholly beneath the pawl as shown in Fig. 4. On applying torque to the input member the selector member 11 will rotate from beneath the pawl so allowing it to drop into its operating position to engage with one or other of the selector limbs and so take up the drive. Alternatively the pawl 7 can be chamfered for the same purpose as shown at 7a in Figs. 5 and 6.

It will be seen therefore that, whether the gear is rotating or stationary, the selector member can be moved from the planet carrier dogs 3a so as to engage the pawls 7 of the annulus 6 without risk of jamming and without the need for a neutral position for the selector member between the two engaging positions. Further, whilst the selector member 11 is engaged with the dogs 3a it cannot be engaged in a driving sense with the pawls 7 since they will be moving faster and over-ride said selector member. As soon as the selector member clears the dogs 3a it will then take up the drive with pawls 7. For the return movement release of the pull on the rod 13 will allow the spring 14 to move the selector member into engagement with the relatively moving dogs 3a of the planet carrier. Jamming cannot occur while the selector member is still axially overlapping with the pawls 7 because, as already stated, such pawls will over-ride the selector as soon as rotation of the selector member is determined by engagement with the dogs 3a.

The advantages obtainable from the construction are, inter alia, that there is no possibility of damage due to chance engagement of the selector with the face of the pawls, nor of jamming due to contact of the selector with the pawls while engaged with the dogs of the planet carrier. Again, since there is no need for a neutral position for the selector member, the axial space hitherto required for such neutral position as well as part of the separate distance of travel for such selector member out of full engagement with one set of complementary engagement elements and into full engagement with the other set can be saved and used either to give a substantial reduction in overall length of the mechanism and provide a lesser movement of the selector mechanism, or alternatively greater engagement length can be provided for the selector member with the complementary engaging elements of dogs and pawls. Obviously also, as there is no neutral position for the selector between engagement with the dogs 3a and with the pawls 7, torque can always be transmitted by it to one or the other of them.

What I claim is:

1. A selector mechanism for a change speed cycle gear hub of the kind having an epicyclic gear train including a sun pinion, a planet carrier with planetary pinions, an annulus and an axially movable selector member with radially projecting arms for engaging an input member for drive alternatively with the planet carrier or the annulus comprising in combination at least one spring loaded pawl mounted on said annulus, at least one driving dog on the end of said planet carrier, the axially movable selector being adapted to engage said planet carrier dog and said annulus pawl, said pawl engaging the selector member to transmit drive when disengaged from the planet carrier dog and to over-ride said selector member when engaged with said planet carrier dog.

2. A selector mechanism according to claim 1 in which said spring loaded pawl and said selector member have relative laterally chamfered faces, so that when the selector member is moved axially away from the planet carrier, the edge of the selector member may pass under the edge of the pawl to trip the same so that it does not obstruct further axial movement of the selector member.

3. A selector mechanism for a change speed cycle gear hub of the kind having an epicyclic gear train including a sun pinion, a planet carrier with planetary pinions, an annulus and an axially movable selector member with radially projecting arms for engaging an input member for drive alternatively with the planet carrier or the annulus, comprising in combination spring loaded pawls mounted on the annulus and driving dogs on the end of the annulus on the end of said planet carrier, the axially movable selector being adapted to engage with said planet carrier driving dogs and said annulus pawls, said pawls engaging the selector member to transmit drive when disengaged from the planet carrier driving dogs and to over-ride said selector member when engaged with said planet carrier dogs.

4. A selector mechanism according to claim 3 in which said spring loaded pawls and said selector member have relative laterally chamfered faces, so that when the selector member is moved axially away from the planet carrier, the edges of the selector member may pass under the corresponding edges of the pawls to trip the same, so that they do not obstruct further axial movement of the selector member.

WILLIAM BROWN.

REFERENCES CITED

The following references are of record in the file of this patent:

UNITED STATES PATENTS

| Number | Name | Date |
|---|---|---|
| 2,168,600 | Brown | Aug. 8, 1939 |
| 2,231,411 | Lawrence | Feb. 11, 1941 |
| 2,379,024 | Thelander | June 26, 1945 |

FOREIGN PATENTS

| Number | Country | Date |
|---|---|---|
| 234,280 | Switzerland | Jan. 3, 1945 |
| 519,945 | Great Britain | Oct. 9, 1939 |
| 567,340 | Great Britain | Feb. 9, 1945 |